(12) United States Patent
Takenaka et al.

(10) Patent No.: US 9,367,735 B2
(45) Date of Patent: Jun. 14, 2016

(54) OBJECT IDENTIFICATION DEVICE

(71) Applicant: DENSO CORPORATION, Kariya, Aichi-pref. (JP)

(72) Inventors: Kazuhito Takenaka, Obu (JP); Takashi Bando, Nagoya (JP); Hossein Tehrani Niknejad, Obu (JP); Masumi Egawa, Aichi-ken (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 14/271,543

(22) Filed: May 7, 2014

(65) Prior Publication Data

US 2014/0334719 A1 Nov. 13, 2014

(30) Foreign Application Priority Data

May 8, 2013 (JP) .................................. 2013-098804

(51) Int. Cl.
*G06K 9/00* (2006.01)
*G06K 9/62* (2006.01)

(52) U.S. Cl.
CPC ........ *G06K 9/00369* (2013.01); *G06K 9/00805* (2013.01); *G06K 9/629* (2013.01)

(58) Field of Classification Search
None
See application file for complete search history.

(56) References Cited

U.S. PATENT DOCUMENTS

| 2011/0010317 A1 | 1/2011 | Ito et al. | |
| 2013/0129143 A1* | 5/2013 | Chen | G06K 9/6218 |
| | | | 382/103 |

FOREIGN PATENT DOCUMENTS

| JP | 2010-165046 A | 7/2010 |
| JP | 2010-204826 A | 9/2010 |
| JP | 2011-090466 A | 5/2011 |
| JP | 2011-138387 A | 7/2011 |
| JP | 2012-043155 A | 3/2012 |

OTHER PUBLICATIONS

"Object Detection with Discriminatively Trained Part Based Models" by Pedro F. Felzenszwalb et al.; IEEE Transactions on Pattern Analysis and Machine Intelligence; Sep. 2010 (discussed on p. 7 of specification).

* cited by examiner

*Primary Examiner* — Siamak Harandi
(74) *Attorney, Agent, or Firm* — Posz Law Group, PLC

(57) ABSTRACT

In an object identification device, each score calculator extracts a feature quantity from the image, and calculates a score using the extracted feature quantity and a model of the specified object. The score represents a reliability that the specified object is displayed in the image. A score-vector generator generates a score vector having the scores as elements thereof. A cluster determiner determines, based on previously determined clusters in which the score vector is classifiable, one of the clusters to which the score vector belongs as a target cluster. An object identifier identifies whether the specified object is displayed in the image based on one of the identification conditions. The one of the identification conditions is previously determined for the target cluster determined by the cluster determiner.

8 Claims, 11 Drawing Sheets

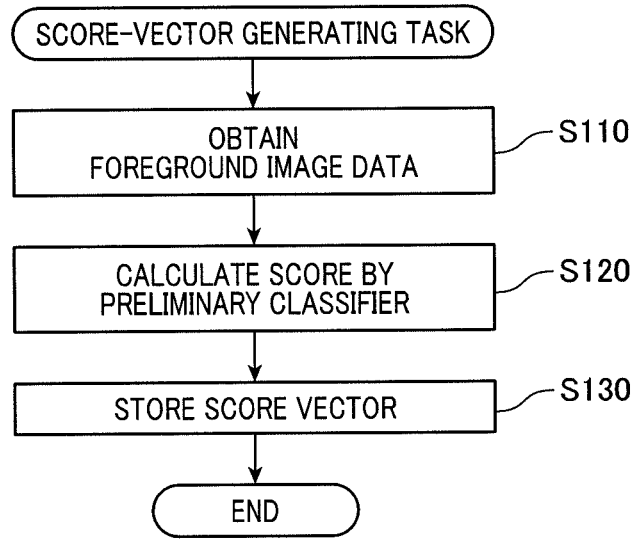
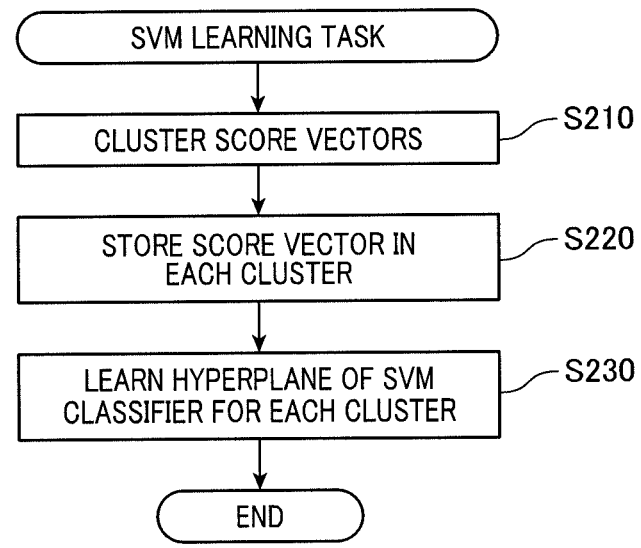

OBJECT IDENTIFICATION DEVICE

CROSS REFERENCE TO RELATED APPLICATIONS

This application is based and claims the benefit of priority from Japanese Patent Application 2013-098804 filed on May 8, 2013, the disclosure of which is incorporated in its entirety herein by reference.

TECHNICAL FIELD

The present disclosure relates to object identification devices for identifying whether specified objects are displayed on an image.

BACKGROUND OF THE INVENTION

There are known object identification devices for identifying a target part of a specified object displayed on an image. In these object identification devices, there is known a technology disclosed in, for example, Japanese Patent Application Publication No. 2010-165046.

The technology disclosed in the Patent Publication divides posture patterns, i.e. posture variations, of the target part of an object into plural posture-pattern categories, and configures a plurality of classifiers provided for the respective posture-pattern categories. For example, if the target part of an object is the face of a person, there are many posture patterns, such as posture patterns of the face orientation, posture patterns of the face tilt, and posture patterns of the face size.

SUMMARY OF THE INVENTION

The inventors have discovered that there is a problem in the aforementioned technology.

Specifically, the technology requires a designer for an object identification device to have determined the posture-pattern categories. This causes the boundaries between the posture-pattern categories to depend on the arbitrary determination of the designer. This may result in improper posture-pattern categories in view of object identification. A lot of the posture patterns may make it difficult for the designer to have determined the posture-pattern categories.

In view of the circumstances set forth above, the present disclosure seeks to provide object identification devices, each of which is capable of achieving the problem set forth above.

Specifically, an alternative aspect of the present disclosure aims to provide such object identification devices, each of which is capable of performing identification of objects displayed on an image without using manually categorized posture patterns.

According to one aspect of the present invention, there is provided a device for identifying whether a specified object is displayed in an image. The device includes a plurality of score calculators each configured to extract a feature quantity from the image, and calculate a score using the extracted feature quantity and a model of the specified object. The score represents a reliability that the specified object is displayed in the image. The device includes a score-vector generator configured to generate a score vector having the scores calculated by the score calculators as elements thereof. The device includes a cluster determiner configured to determine, based on previously determined clusters in which the score vector is classifiable, one of the clusters to which the score vector belongs as a target cluster. The device includes an object identifier configured to have identification conditions previously determined for the respective clusters, and identify whether the specified object is displayed in the image based on one of the identification conditions. The one of the identification conditions is previously determined for the target cluster determined by the cluster determiner.

In the device, the score vectors in a vector space can be automatically classified into the clusters using one of known clustering methods with an aid of a computer. For this reason, the configuration of the device according to the one aspect results in no need for a designer to have pre-determined clusters required to classify score vectors corresponding to the posture patterns set forth above. Thus, it is possible to reduce the occurrence of a case where the previously determined clusters are improper for identification of objects.

In addition, the configuration of the object identification device uses the previously determined clusters for identifying whether the specified object is displayed in the image. This makes it easy to determine the clusters even if there are a lot of score vectors corresponding to a lot of posture patterns of the specified objects.

Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other objects and aspects of the invention will become apparent from the following description of embodiments with reference to the accompanying drawings in which:

FIG. 7 is a flowchart schematically illustrating a score-vector generating task carried out by the learning apparatus illustrated in FIG. 6;

FIG. 8 is a flowchart schematically illustrating an SVM learning task carried out by the learning apparatus illustrated in FIG. 6;

DETAILED DESCRIPTION OF EMBODIMENT

Figure 1:
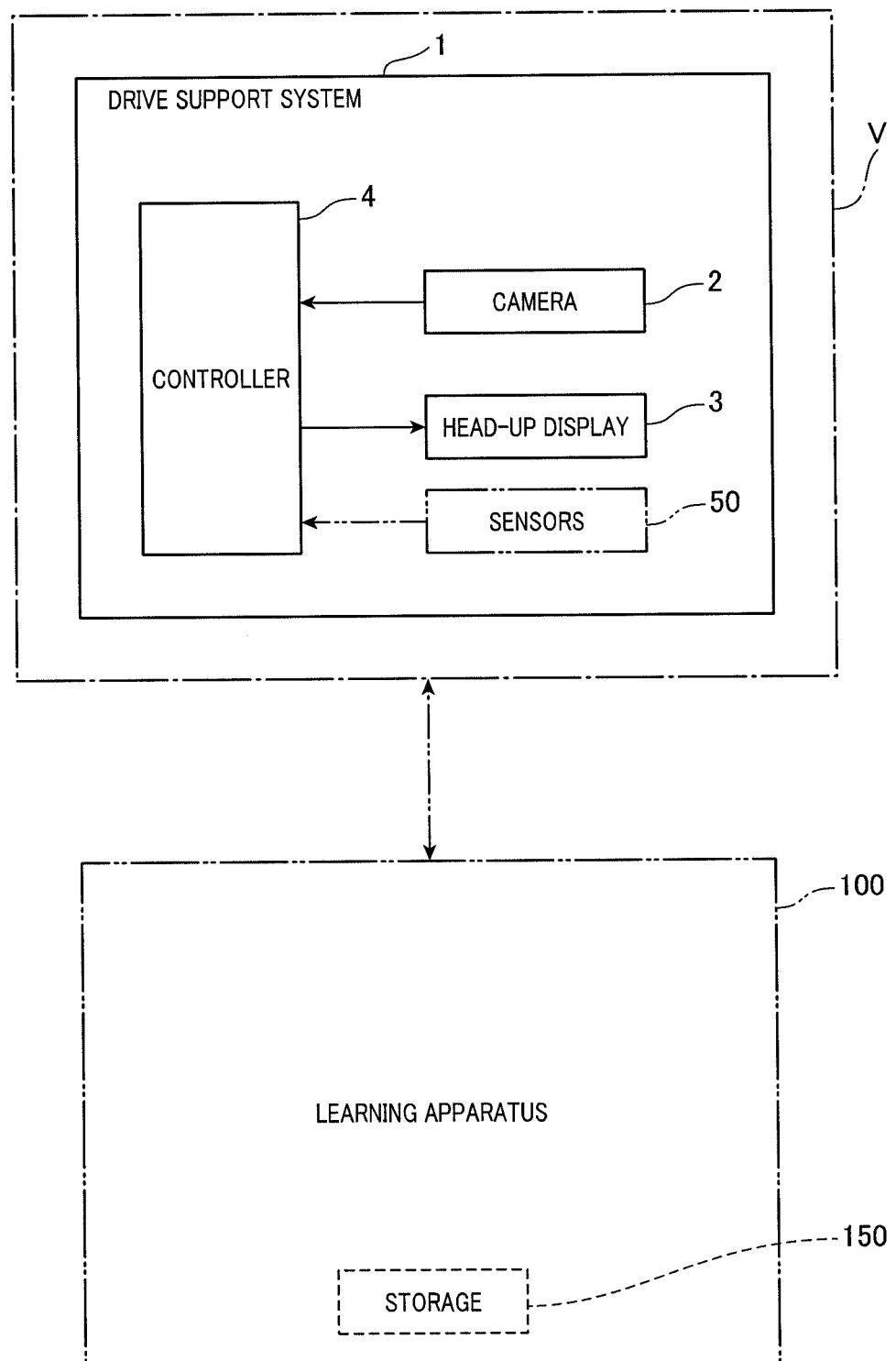
FIG. 1 is a block diagram schematically illustrating an example of the overall structure of a drive assist system to which an object identification device according to an embodiment of the present disclosure is applied.

An embodiment of the present disclosure will be described hereinafter with reference to the accompanying drawings. In the drawings, identical reference characters are utilized to identify identical corresponding components.

Referring to FIG. 1, there is provided a drive assist system 1 in which an object identification device according to this embodiment is applied to be installed. The drive assist system 1 is installed in a vehicle V to be assisted. The drive assist system 1 is equipped with a camera 2, a head-up display (HUD) 3, and a controller 4.

The drive assist system 1 is operative to pick up images of a region ahead of the running vehicle V, and display an image indicating the position of a pedestrian located ahead of the running vehicle V.

Specifically, the camera 2 is operative to continuously pick up scenes ahead of the running vehicle V; a driver of the running vehicle V can view the scenes via the windshield. Hereinafter, image data acquired by the camera's 2 pickup operations will be referred to as foreground image data.

The HUD 3 is located to project an image on the windshield from, for example, the lower side of the windshield. This permits a driver of the running vehicle V to view the projected image overlapped on an actual foreground ahead of the running vehicle V.

The controller 4 is communicably connected to the camera 2 and the HUD 3, and is designed as, for example, a known microcomputer unit (programmed logic unit) comprised of at least a CPU 4a, a storage 4b, an I/O unit 4c, a bus 4d connecting the components 4a, 4b, and 4c, and so on. As the storage 4b, a non-transitory computer-readable storage medium, such as a ROM and/or a RAM can be used. The controller 4 is operative to obtain foreground image data each time the foreground image data is picked up and sent from the camera 2, and control the HUD 3 to project, on the windshield, an image indicating the position of a pedestrian located ahead of the running vehicle V. Note that the controller 4 can obtain an analog foreground image sent from the camera 2, and convert the analog foreground image into foreground image data.

Figure 2:
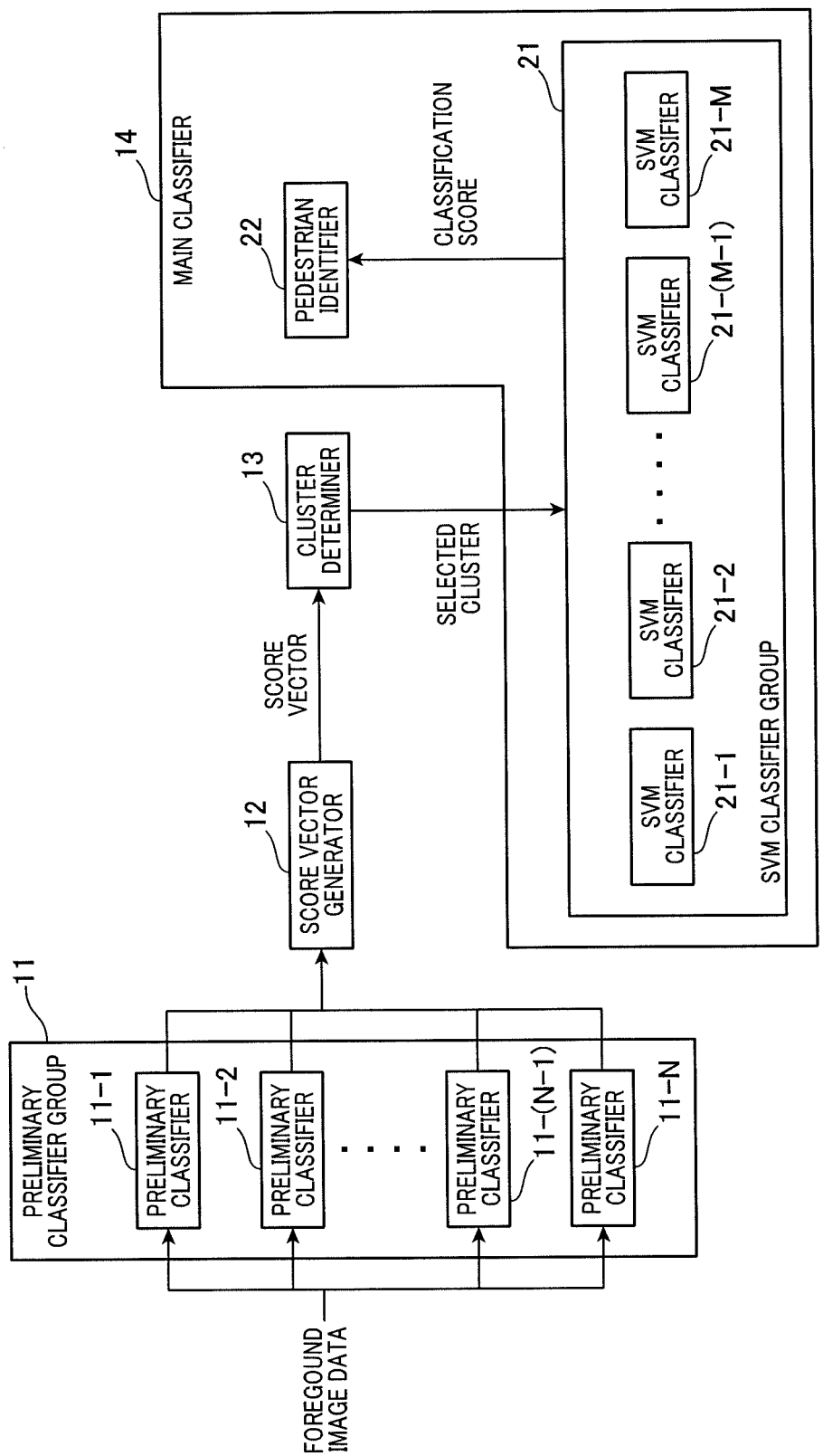
FIG. 2 is a functional block diagram schematically illustrating an example of the overall structure of the drive assist system according to the embodiment.

Referring to FIG. 2, the controller 4 functionally includes a preliminary classifier group 11, a score vector generator 12, a cluster determiner 13, and a main classifier 14. A set of computer program instructions stored in the storage 4b causes the CPU 4a to serve as the functional blocks 11 to 14. In this embodiment, the elements 11, 12, 13, and 14 for example constitute an object identification device.

The preliminary classifier group 11 includes N preliminary classifiers 11-1, 11-2, . . . , 11-(N−1), and 11-N; N is an integer equal to or higher than 2.

Each of the N preliminary classifiers 11-1 to 11-N has a deformable parts model (DPM), and classifies whether there is a pedestrian in corresponding foreground image data sent from the camera 2 using the DPM.

The DPM is a known tool that:

represents a target object to be detected as the collection of a plurality of parts;

overlaps a plurality of part regions respectively corresponding to the plurality of parts on a digital foreground image based on the foreground image data;

calculates a degree of similarity, referred to as a score, of a section of the digital foreground image contained in each part region to a corresponding part model using feature quantities of the corresponding section of the digital foreground image and the relative position of the part region to the other part regions; and detect the target object in the digital foreground image using the calculated scores.

In other words, a score shows a reliability that parts of a pedestrian are displayed in a section of a digital foreground image contained in each part region.

The details of the DPM are disclosed in, for example, P. F. Felzenszwalb et al., "*Object Detection with Discriminatively Trained Part Based Models*", IEEE TRANSACTIONS ON PATTERN ANALYSIS AND MACHINE INTELLIGENCE, Vol. 32, no. 9, pp. 1627-1645, September 2010.

Figure 3:
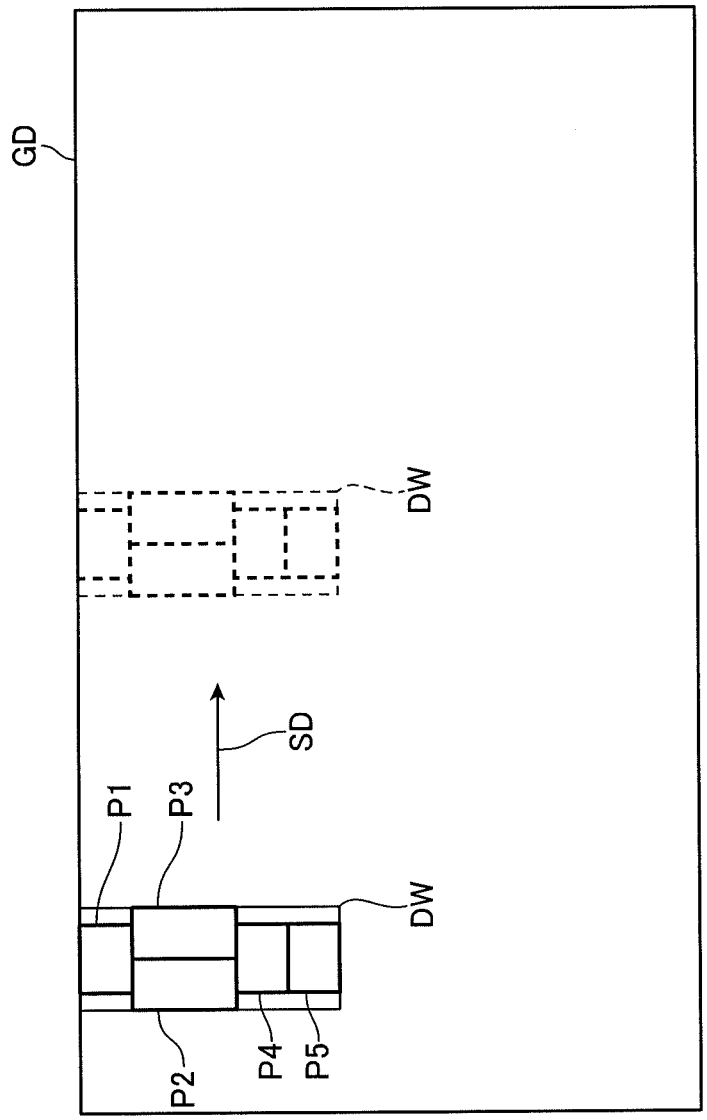
FIG. 3 is a view schematically illustrating a detection window according to the embodiment.

Referring to FIG. 3, a preliminary classifier 11-$i$ ($i$=1, 2, . . . , or N) is operative to calculate the scores using one detection window DW and five part regions P1, P2, P3, P4, and P5 corresponding to the head, left shoulder right shoulder, lumbar portion, and leg portion of a pedestrian.

Note that pedestrians displayed in a digital foreground image sent from the camera 2 are estimated to have various posture patterns, i.e. posture variations. Thus, it is estimated that pedestrians are displayed in a foreground image to have different posture patterns. For example, the posture patterns include variations in size of pedestrians, and variations in orientation of the fronts of pedestrians, such as the forward direction, the backward direction, a side direction, and the like. The posture patterns include variations in the physical states of pedestrians, such as walking or standing pedestrians, and variations in dress of pedestrians, such as shirts or coats of pedestrians.

The detection window DW has, for example, a rectangular shape able to enclose the rectangular five part regions P1, P2, P3, P4, and P5. Specifically, the first part region P1 is located at the top center of the detection window DW corresponding to the head of a pedestrian; the first part region P1 has a width lower than the width of the detection window DW. The second and third part regions P2 and P3 are located to be juxtaposed at the lower side of the first part region P1 respectively corresponding to the right and left shoulders of a pedestrian. The set of juxtaposed second and third part regions P2 and P3 has a width equal to or less than the width of the detection window DW. The fourth part region P4 is located at the lower side of the second and third part regions P2 and P3; the fourth part region P4 corresponds to the lumbar portion of a pedestrian. The fifth part region P5 is located at the bottom center of the detection window DW to be aligned with the fourth part region P4. The fifth part region P5 corresponds to the leg portion of a pedestrian.

As illustrated in FIG. 3, the preliminary classifier 11-$i$ is operative to perform a score calculation task.

The score calculation task is designed to repeatedly scan the detection window DW from, for example, the top left to the bottom right of foreground image data, i.e. a digital foreground image, GD while changing the size of the detection window DW (see the arrow SD in FIG. 3). The score calculation task is also designed to calculate values of a plurality of scores for each of the scanned detection windows DW. For example, the score calculation task is designed to use a known matching algorithm by obtaining HOG (Histograms of Oriented Gradients) from an image part contained in each of the scanned detection windows DW and calculating values of the scores based on the obtained HOG for each of the scanned detection windows DW.

For example, in this embodiment, the plural scores include a whole-body shape score $s_0$, a head shape score $s_1$, a right-shoulder shape score $s_2$, a left-shoulder shape score $s_3$, a lumbar shape score $s_4$, a leg shape score $s_5$, a head position score $d_1$, a right-shoulder position score $d_2$, a left-shoulder position score $d_3$, a lumbar position score $d_4$, and a leg position score $d_5$.

The whole-body shape score so shows a degree of similarity between the shape of an image contained in a scanned detection window DW and the whole-body shapes of a previously prepared pedestrian model corresponding to the preliminary cluster 11-i.

The head shape score $s_1$ shows a degree of similarity between the shape of an image contained in the first part region P1 of a scanned detection window DW and the shapes of the heads of the pedestrian model.

The right-shoulder shape score $s_2$ shows a degree of similarity between the shape of an image contained in the second part region P2 of a scanned detection window DW and the shapes of the right shoulders of the pedestrian model.

The left-shoulder shape score $s_3$ shows a degree of similarity between the shape of an image contained in the third part region P3 of a scanned detection window DW and the shapes of the left shoulders of the pedestrian model.

The lumbar shape score $s_4$ shows a degree of similarity between the shape of an image contained in the fourth part region P4 of a scanned detection window DW and the shapes of the lumbar portions of the pedestrian model.

The leg shape score $s_5$ shows a degree of similarity between the shape of an image contained in the fifth part region P5 of a scanned detection window DW and the shapes of the leg portions of the pedestrian model.

The head position score $d_1$ shows a degree of similarity between the position of the first part region P1 of a scanned detection window DW and positions of heads of the pedestrian model.

The right-shoulder position score $d_2$ shows a degree of similarity between the position of the second part region P2 of a scanned detection window DW and positions of right shoulders of the pedestrian model.

The left-shoulder position score $d_3$ shows a degree of similarity between the position of the third part region P3 of a scanned detection window DW and positions of left shoulders of the pedestrian model.

The lumbar position score $d_4$ shows a degree of similarity between the position of the fourth part region P4 of a scanned detection window DW and positions of lumber portions of the pedestrian model.

The leg position score $d_5$ shows a degree of similarity between the position of the fifth part region P5 of a scanned detection window DW and positions of leg portions of the pedestrian model.

The N preliminary classifiers 11-1 to 11-N are operative to perform the score calculation task based on the trained results, i.e. previously prepared pedestrian models. Each of the preliminary classifiers has a model trained with learning image data different from each other. These learning images are divided by their characteristics, for example, cameras which took these learning images, places where these learning images were taken, and/or an aspect ratio of a rectangle indicating a pedestrian in each learning image, or divided by randomly. For the training with the learning image data, one of known learning methods of DPM can be taken. This results in calculation of the values of the scores $s_0$ to $s_5$ and $d_1$ to $d_5$ for each of the scanned detection windows DW.

The score vector generator 12 is operative to generate a score vector for each of the scanned detection windows DW based on the values of the scores $s_0$ to $s_5$ and $d_1$ to $d_5$ calculated by each of the N preliminary classifiers 11-1 to 11-N.

Specifically, the score vector generator 12 calculates N six-dimensional vectors $V_i$, which are given by the following expressions [1], based on the scores $s_0$ to $s_5$ and $d_1$ to $d_5$ calculated by the respective N preliminary classifiers 11-i (i=1, 2, ..., N):

$$V_i=(s_0,s_1+d_1,s_2+d_2,s_3+d_3,s_4+d_4,s_5+d_5) \quad [1]$$

Specifically, the sum of the score $s_1$ and the score $d_1$, the sum of the score $s_2$ and the score $d_2$, the sum of the score $s_3$ and the score $d_3$, the sum of the score $s_4$ and the score $d_4$, and that of the score $s_5$ and the score $d_5$, which are calculated by a preliminary classifier 11-i, generate a corresponding six-dimensional vector $V_i$.

Then, the score vector generator 12 arranges the six-dimensional vectors $V_i$ in the matrix of 6 rows×N columns, thus generating a 6×N vector as the score vector.

The cluster deter miner 13 is operative to have previously determined M clusters CL-1 to CL-M (M is an integer equal to or higher than 2), and determine that the score vector generated by the score vector generator 12 is classified into which of the previously deter mined M clusters CL-1 to CL-M. A cluster is the set of score vectors classified by distances between the score vectors in a (6×N) coordinate feature space; the (6×N) coordinate feature space has coordinates each corresponding to one element of a score vector. In this embodiment, as a distance between score vectors, a Euclidean distance is used.

Figure 4:
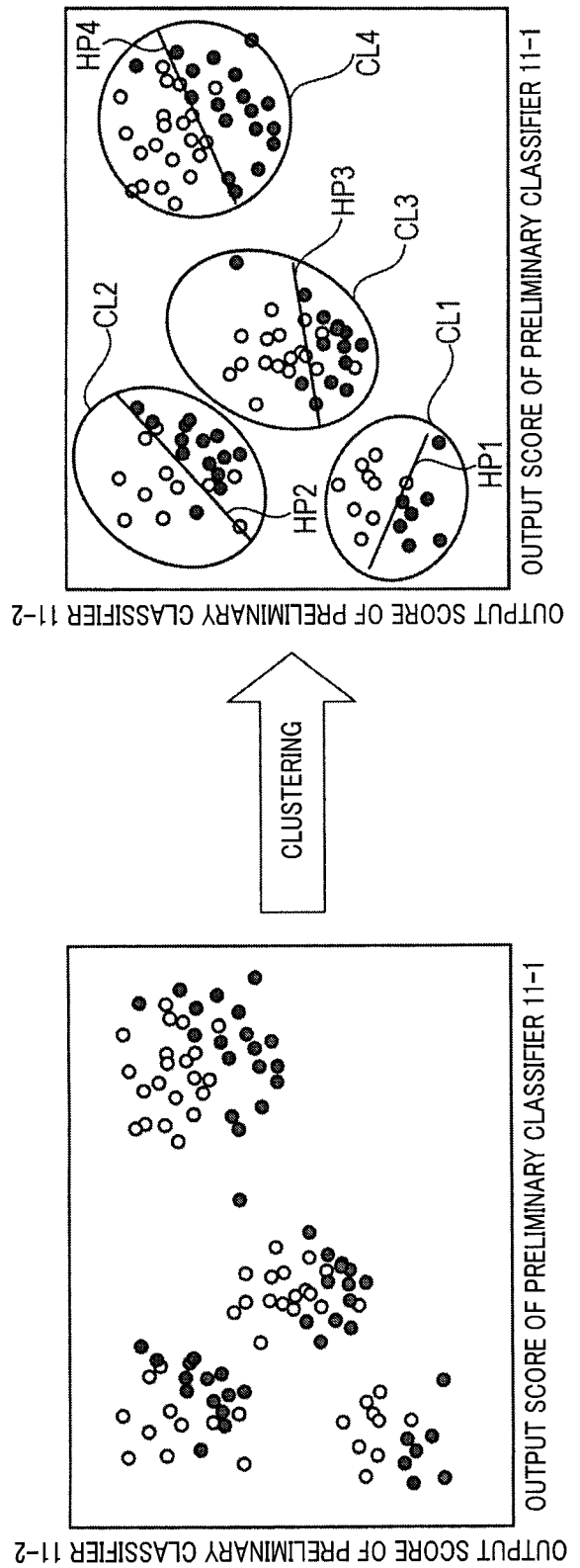
FIG. 4 shows graphs, the left side graph schematically illustrating a concept of a distribution of score vectors in a (6×N) feature space according to the embodiment, the right side graph schematically illustrating clustered results of the distribution of score vectors in the (6×N) feature space.

The left side of FIG. 4 is a graph schematically illustrating a concept of the distribution of score vectors, illustrated by circles, in the (6×N) feature space, which will also be referred to as a vector space, VS, and the right side of FIG. 4 is a graph schematically illustrating the clustered results of the distribution of score vectors in the (6×N) feature space VS. In order to simplify the descriptions of the concept, in FIG. 4, the horizontal axis of each graph represents one element of six scores constituting the six-dimensional vector $V_1$ generated based on the preliminary classifier 11-1, and the vertical axis of each graph represents one element of six scores constituting the six-dimensional vector $V_2$ generated based on the preliminary classifier 11-2. The right side of FIG. 4 demonstrates that each of score vectors is classified into any one of a first cluster CL1, a second cluster CL2, a third cluster CL3, and a fourth cluster CL4.

Specifically, the cluster determiner 13 is operative to:

calculate a distance between the center of each of the M clusters CL-1, CL-2, ..., CL-M and the position of the score vector input from the score vector generator 12; and compare the distances calculated for the respective M clusters CL-1 to CL-M with each other, thus determining one of the clusters CL-1 to CL-M to which the input score vector belongs; the distance for the determined one of the clusters CL-1 to CL-M is the shortest in all the distances.

The main classifier 14 functionally includes an SVM classifier group 21 and a pedestrian identifier 22.

The SVM (Support Vector Machine) classifier group 21 includes M SVM classifiers 21-1, 21-2, ..., 21-(M−1), and 21-M. The M SVM classifiers 21-1 to 21-M are provided for the respective M clusters CL-1, CL-2, ..., CL-(M−1), CL-M.

Each SVM classifier 21-j (j=1, ..., and M) has a known linear support vector machine (linear SVM), and classifies whether a score vector belonging to a corresponding cluster CL-j shows a pedestrian. For example, each SVM classifier 21-j uses a predetermined, i.e. a previously learned, i.e. trained, hyperplane for classifying a score vector belonging to a corresponding cluster CL-j into a pedestrian or a non-pedestrian. Specifically, each SVM classifier 21-j outputs, to the pedestrian identifier 22, a positive value as a classification score if it is determined that an input score vector is located at one side of the learned hyperplane showing a pedestrian, and a negative value as the classification score if it is determined that an input score vector is located at the other side of the learned hyperplane showing a non-pedestrian.

The right side of FIG. 4 schematically illustrates hyperplanes HP1, HP2, HP3, and HP4 previously determined for the respective clusters CL-1, CL-2, CL-3, and CL-4.

Note that a score vector corresponding to a cluster CL-j determined by the cluster determiner 13 is input to a corresponding SVM cluster 21-j. For example, if the cluster determiner 13 determines that a score vector generated by the score vector generator 12 is classified into the cluster CL-2, the score vector is input to the SVM classifier 21-2.

The pedestrian identifier 22 is operative to identify whether there is a pedestrian in each of the scanned detection windows DW based on the classification score corresponding to one of the scanned detection windows DW output from the SVM classifier group 21. For example, the pedestrian identifier 22 identifies that there is a pedestrian in a specified scanned detection window DW if the classification score corresponding to the specified scanned detection window DW output from the SVM classifier group 21 is a positive value. Otherwise, if the classification score corresponding to a specified scanned detection window DW output from the SVM classifier group 21 is a negative value, the pedestrian identifier 22 identifies that there are no pedestrians in the specified scanned detection window DW.

Next, a task for identifying pedestrians, which will be referred to as a pedestrian identification task, carried out by the controller 4 will be described hereinafter with reference to FIG. 5. The pedestrian identification task is repeatedly carried out by the controller 4 while the drive assist system 1 is running.

When starting the pedestrian identification task, the controller 4 obtains foreground image data, i.e. a digital foreground image, from the camera 2 in step S10. Next, the controller 4 serves as the N preliminary classifiers 11-1 to 11-N to perform the score calculation task based on the foreground image data sent from the camera 2, respectively. This calculates values of the scores $s_0^1, s_1^1, s_2^1, s_3^1, s_4^1, s_5^1, d_1^1, d_2^1, d_3^1, d_4^1, d_5^1, s_0^2, \ldots, s_0^N, s_1^N, s_2^N, s_3^N, s_4^N, s_5^N, d_1^N, d_2^N, d_3^N, d_4^N, d_5^N$ for each of the scanned detection windows DW in step S20. Note that so represents the whole-body shape score calculated by the preliminary classifier 11-j, $s_1^j$ represents the head shape score calculated by the preliminary classifier 11-j, and $s_2^j$ represents the right-shoulder shape score calculated by the preliminary classifier 11-j. $s_3^j$ represents the left-shoulder shape score calculated by the preliminary classifier 11-j, $s_4^j$ represents the lumber shape score calculated by the preliminary classifier 11-j, and $s_5^j$ represents the leg shape score calculated by the preliminary classifier 11-j. Similarly, represents the head position score calculated by the preliminary classifier 11-j, $d_2^j$ represents the right-shoulder position score calculated by the preliminary classifier 11-j, $d_3^j$ represents the left-shoulder position score calculated by the preliminary classifier 11-j, $d_4^j$ represents the lumber position score calculated by the preliminary classifier 11-j, and $d_5^j$ represents leg position score calculated by the preliminary classifier 11-j.

Following the operation in step S20, the controller 4 serves as the score vector generator 12 to generate a score vector for each of the scanned detection windows DW based on the values of the scores $s_0^1, s_1^1, s_2^1, s_3^1, s_4^1, s_5^1, d_1^1, d_2^1, d_3^1, d_4^1, d_5^1, s_0^2, \ldots, s_0^N, s_1^N, s_2^N, s_3^N, s_4^N, s_5^N, d_1^N, d_2^N, d_3^N, d_4^N, d_5^N$ in step S30. Next, the controller 4 serves as the cluster determiner 13 to determine the score vector for each of the scanned detection windows DW is classified into which of the previously determined M clusters CL-1 to CL-M in step S40.

Following the operation in step S40, the controller 4 serves as an SVM classifier 21-j, corresponding to a cluster CL-j to which the score vector for each of the scanned detection windows DW belongs, to calculate a classification score for each of the scanned detection window DW in step S50. Then, the controller 4 serves as the pedestrian identifier 22 to determine whether there is a pedestrian in each of the scanned detection windows DW based on the calculated classification score for a corresponding one of the scanned detection windows DW in step S60.

Next, a learning apparatus 100 for learning the SVM classifier group 21 used by the controller 4 for performing the pedestrian identification task will be described hereinafter with reference to FIGS. 6 and 7. The learning apparatus 100 can be communicably connected to the drive assist system 1 (see two-dot chain line in FIG. 1).

Figure 6:
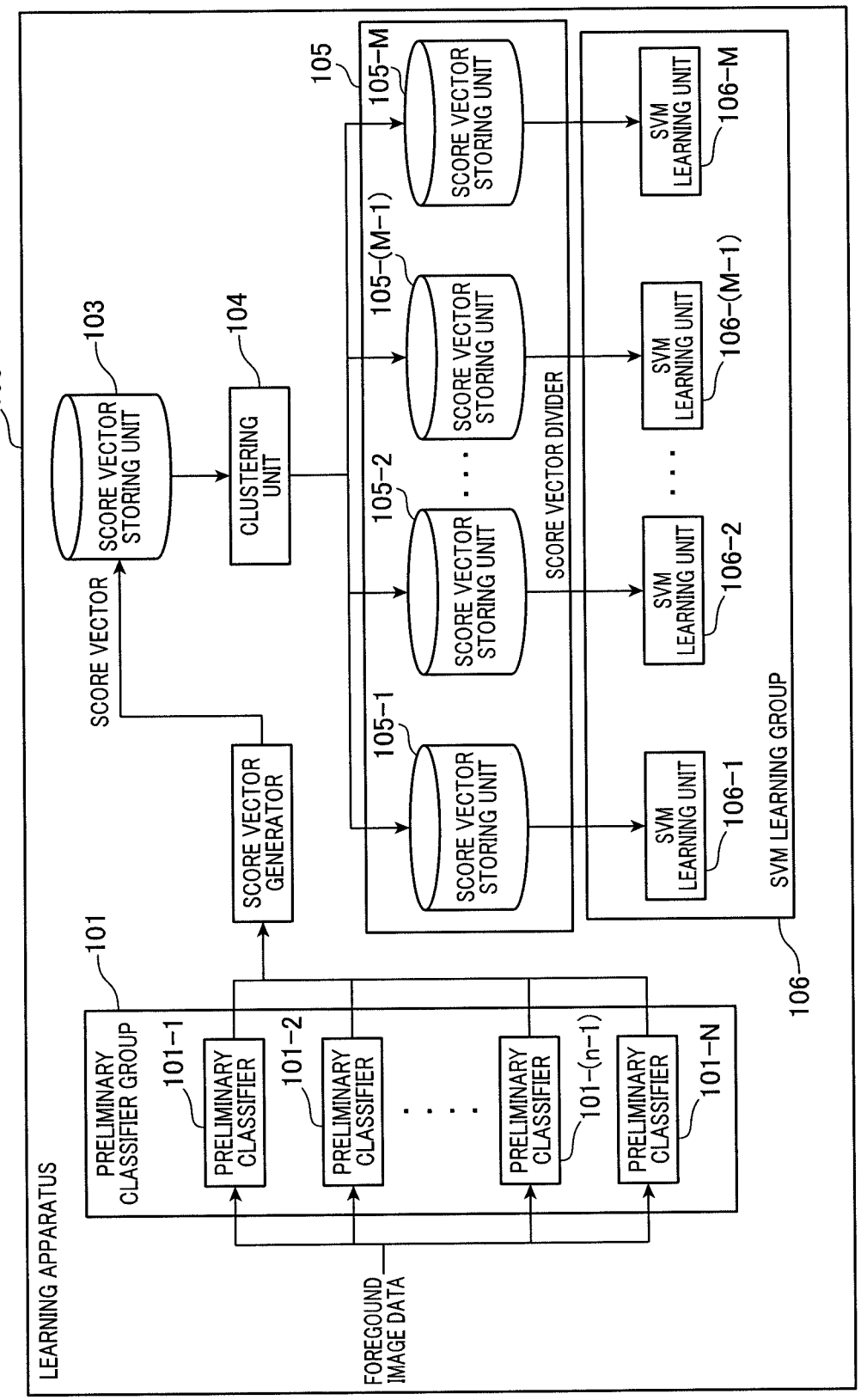
FIG. 6 is a functional block diagram schematically illustrating an example of the overall structure of a learning apparatus according to the embodiment.

Referring to FIG. 6, the learning apparatus 100 functionally includes a preliminary classifier group 101, a score vector generator 102, a score vector storing unit 103, a clustering unit 104, a score vector divider 105, and an SVM learning group 106.

The preliminary classifier group 101 includes N preliminary classifiers 101-1, 101-2, ..., 101-(N−1), and 101-N; N is an integer equal to or higher than 2. The N preliminary classifiers 101-1 to 101-N are substantially the same as the N preliminary classifiers 10-1 to 10-N, respectively.

The score vector generator 102 is operative to generate score vectors based on the values of the scores $s_0^j$ to $s_5^j$ and $d_1^j$ to $d_5^j$ calculated by each of the N preliminary classifiers 11-j in the same approach as the score vector generator 12.

The score vector storing unit 103 is operative to store therein the score vectors generated by the score vector generator 102. In this embodiment, a plurality of, for example, 1000, score vectors are stored in the score vector storing unit 103 as learning score vectors.

The clustering unit 104 is operative to cluster the plurality of for example, 1000, learning score vectors stored in the score vector storing unit 103 using at least one of known clustering methods. The known clustering methods include, for example, a k-means method, a spectral clustering method, an agglomerative clustering method, a clustering method using Gaussian mixture model, a clustering method using a Dirichlet process mixture, and so on. This clustering divides the plurality of score vectors into a plurality of clusters. For example, in this embodiment, the clustering unit 104 clusters the plurality of learning score vectors into M clusters CL-1 to CL-M (M is an integer equal to or higher than 2).

The score vector divider 105 includes M score vector storing units 105-1, 105-2, ..., 105-(M−1), and 105-M provided for the respective clusters CL-1 to CL-M. Each of the score vector storing units 105-1 to 105-M is operative to store therein learning score vectors divided into a corresponding one of the clusters CL-1 to CL-M. For example, learning score vectors divided by the score vector divider 105 into the cluster CL-2 are stored in the score vector storing unit 105-2.

The SVM learning group 106 includes SVM learning units 106-1, 106-2, ..., 106-(M−1), and 106-M. Each SVM learning unit 106-j (j=1, 2, ..., and M) is operative to read learning score vectors stored in the corresponding score vector storing unit 105-$j$, and learn, in accordance with a known linear SVM, an optimal hyperplane for separating the learning score vectors stored in the corresponding score vector storing unit 105-$j$ into a first group containing some learning score vectors showing there is a pedestrian and a second group containing the remaining learning score vectors showing there are no pedestrians.

Specifically, each SVM learning unit 106-$j$ obtains, as a trained hyperplane, a maximum-margin hyperplane that separates the learning score vectors contained in the first group and the learning score vectors contained in the second group while the margin between the maximum-margin hyperplane and the score vectors contained in each of the first and second groups is maximal. For example, each SVM learning unit 106-$j$ determines, as a trained hyperplane, a maximum-margin hyperplane on which some score vectors contained in each of the first and second groups are located. This training of the hyperplane means a training of optimal weights for linear coupling of each variable in the score vectors required for obtaining maximum-margin between the first and second groups.

Next, a task for generating the learning score vectors, which will be referred to as a score-vector generating task, carried out by the learning apparatus 100 will be described hereinafter with reference to FIG. 7. The score-vector generating task is carried out each time the learning apparatus 100 successively reads one of P-pieces of learning image data stored in, for example, a storage 150; P is an integer equal to or greater than 2.

In this embodiment, as the P-pieces of learning image data, 1000 pieces of learning image data, which are different from each other, are previously prepared. The 1000 pieces of learning image data are divided into a first group of pedestrian image data and a second group of non-pedestrian image data. On each piece of pedestrian image data in the first group, a pedestrian is displayed, and on each piece of non-pedestrian image data in the second group, no pedestrians are displayed. To each of the P-pieces of learning image data, information indicative of whether a corresponding piece of learning image data is the pedestrian image data or the non-pedestrian image data is attached.

When starting the score-vector generating task, the learning apparatus 100 obtains, as target learning image data, one of the P-pieces of learning image data stored in the storage 150 in step S110. Next, the learning apparatus 100 serves as the N preliminary classifiers 101-1 to 101-N to perform the score calculation task set forth above based on the target learning image data, thus calculating values of scores $s_0^1, s_1^1, s_2^1, s_3^1, s_4^1, s_5^1, d_1^1, d_2^1, d_3^1, d_4^1, d_5^1, s_0^2, \ldots, s_0^N, s_1^N, s_2^N, s_3^N, s_4^N, s_5^N, d_1^N, d_2^N, d_3^N, d_4^N, d_5^N$ in the same approach as the N preliminary classifiers 10-1 to 10-N in step S120.

Following the operation in step S120, the learning apparatus 100 serves as the score vector generator 102 to generate a learning score vector based on the values of the scores $s_0^1, s_1^1, s_2^1, s_3^1, s_4^1, s_5^1, d_1^1, d_2^1, d_3^1, d_4^1, d_5^1, s_0^2, \ldots, s_0^N, s_1^N, s_2^N, s_3^N, s_4^N, s_5^N, d_1^N, d_2^N, d_3^N, d_4^N, d_5^N$, and stores the score vector in the score vector storing unit 103. As described above, the learning apparatus 100 repeats the score-vector generating task each time the learning apparatus 100 reads one of the P-pieces of learning image data from the storage 150. This results in P learning score vectors for the respective P-pieces of learning image data being generated to be stored in the score vector storing unit 103.

Next, a task for learning a hyperplane for each SVM classifier 21-$j$, which will be referred to as an SVM learning task, carried out by the learning apparatus 100 will be described hereinafter with reference to FIG. 8. The SVM learning task is carried out by the learning apparatus 100 when an instruction for starting the SVM learning task is input to the learning apparatus 100 from, for example, the drive assist system 1 while the drive assist system 1 is communicably connecting to the learning apparatus 100.

Referring to FIG. 8. when starting the SVM learning task, the learning apparatus 100 serves as the clustering unit 104 to cluster each of the P learning score vectors stored in the score vector storing unit 103 into any one of the M clusters CL-1 to CL-M in step S210.

Next, the learning apparatus 100 serves as the score vector divider 105 to store learning score vectors divided in each of the clusters CL-1 to CL-M in a corresponding one of the score vector storing units 105-1 to 105-M provided for the respective clusters CL-1 to CL-M in step S220. For example, in step S220, the learning apparatus 100 stores learning score vectors divided into the cluster CL-2 in the score vector storing unit 105-2.

Following the operation in step S220, the learning apparatus 100 serves as each SVM learning unit 106-$j$ to read learning score vectors stored in the corresponding score vector storing unit 105-$j$, and learn, in accordance with the known linear SVM, a maximum-margin hyperplane in step S230; the hyperplane is to separate the learning score vectors stored in the corresponding score vector storing unit 105-$j$ into a first group containing one or more learning score vectors showing there is a pedestrian and a second group containing one or more learning score vectors showing there are no pedestrians. After completion of the optimal hyperplanes learned for all the clusters CL-1 to CL-M, the maximum-margin hyperplanes learned for the respective clusters CL-1 to CL-M are sent to the drive assist system 1, so that the maximum-margin hyperplanes are stored in the respective SVM classifiers 21-1 to 21-M. Thus, it is possible for the controller 4 to update the maximum-margin hyperplanes previously stored in the respective SVM classifiers 21-1 to 21-M into newly learned maximum-margin hyperplanes by inputting the instruction for starting the SVM learning task to the learning apparatus 100 when the learning apparatus 100 is communicably connected to the drive assist system 1. Note that, after completion of the hyperplanes learned for all the clusters CL-1 to CL-M, the SVM learning task is terminated.

Next, a method of linearly coupling some score vectors in each of the first and second groups, which is used by the drive support system 1 according to this embodiment, is effective in identification of a prepared data set.

Figure 9:
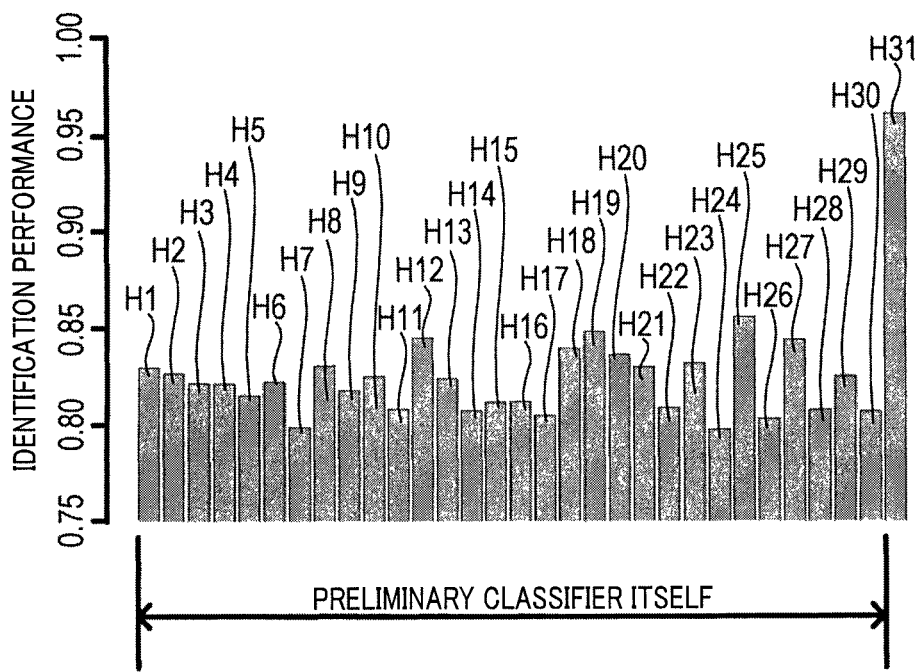
FIG. 9 is a bar graph schematically illustrating identification performances of preliminary classifiers.

FIG. 9 is a bar graph schematically illustrating identification performances H1 to H30 for the prepared data set achieved by respective thirty preliminary classifiers that have been previously trained based on respective learning image data different from each other. In contrast, FIG. 9 also illustrates an identification performance H31 for the same data set achieved by the method of linearly coupling variables, i.e. components, of the score vectors based on scores calculated by the thirty preliminary classifiers.

FIG. 9 clearly demonstrates that the identification performance (H31) achieved by the method, which linearly couples components of the score vectors generated based on scores calculated by the thirty preliminary classifiers, is higher than the identification performances (H1 to H30) achieved by the respective thirty preliminary classifiers.

Next, clustering score vectors in a coordinate feature space VS having coordinates each corresponding to one element of a score vector, which is used by the drive support system 1 according to this embodiment, is effective in identification of prepared data sets. In other words, a method configured that a cluster in the coordinate feature space VS formed by scores output from each preliminary classifier serves as an input feature domain for a corresponding SVM classifier, which is used by the drive support system 1, is effective in identification of prepared data sets. That is, the method used by the drive support system 1 divides the whole feature space VS based on scores obtained by the preliminary classifiers into clusters, respectively, used as input feature domains for corresponding SVM classifiers.

Figure 10:
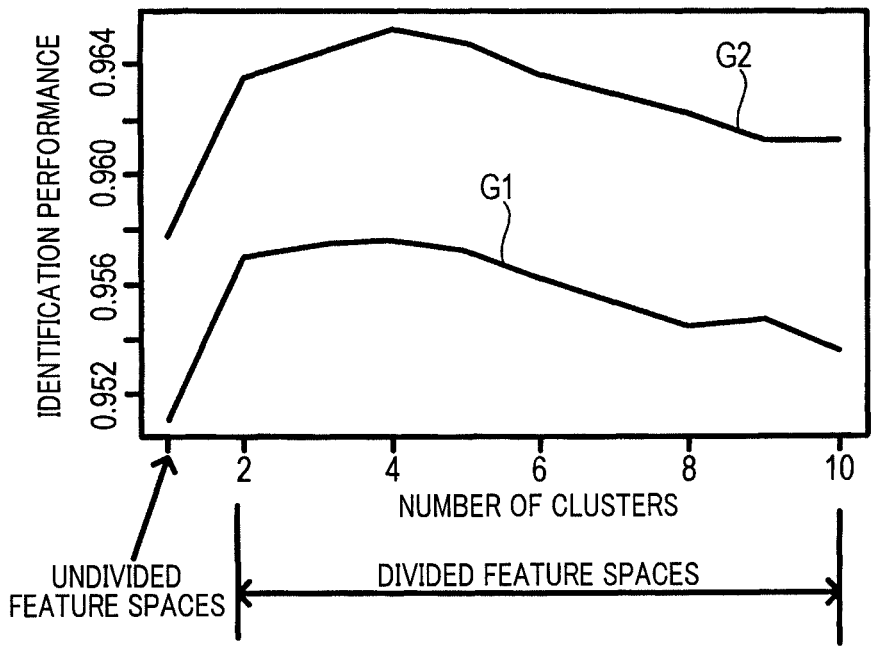
FIG. 10 is a graph schematically illustrating the relationship between the number of clusters and identification performance.

As illustrated in FIG. 10, an identification performance with score vectors calculated by preliminary classifiers trained by data set A achieved by the method, which divides the whole feature space VS based on the score vectors obtained by the preliminary classifiers into clusters respectively used as input feature domains for corresponding SVM classifiers, is higher than that achieved by a method that uses the whole feature space VS based on the score vectors obtained by the preliminary classifiers without dividing it (see graph G1).

Similarly, an identification performance with score vectors combined from two score vectors calculated by the preliminary classifiers trained by data set A and other preliminary classifiers trained by data set B achieved by the method, which divides the whole feature space based on score vectors obtained by the preliminary classifiers into clusters respectively used as input feature domains for corresponding SVM classifiers, is higher than that achieved by the method that uses the whole feature space VS based on the score vectors obtained by the preliminary classifiers without dividing it (see graph G2).

As described above, the drive support system 1 according to this embodiment is provided with the N preliminary classifiers 11-1 to 11-N. Each of the N preliminary classifiers 11-1 to 11-N obtains feature quantities, which have been predetermined to identify pedestrians in images, from a part of foreground image data contained in each of the scanned detection windows DW. Then, each of the N preliminary classifiers 11-1 to 11-N calculates, based on the obtained feature quantities, scores $s_0$ to $s_5$ and $d_1$ to $d_5$ for each of the scanned detection windows DW.

The drive support system 1 is also provided with the score vector generator 12. The score vector generator 12 generates a score vector for each of the scanned detection windows DW based on the values of the scores $s_0$ to $s_5$ and $d_1$ to $d_5$ calculated by each of the N preliminary classifiers 11-1 to 11-N.

The drive support system 1 is further provided with the cluster determiner 13. The cluster determiner 13 determines that the score vector generated by the score vector generator 12 is classified into which of previously determined M clusters CL-1 to CL-M (M is an integer equal to or higher than 2).

In addition, the drive support system 1 is provided with the main classifier 14. The main classifier 14 has a previously trained, i.e. learned, hyperplane provided for each of the clusters CL-1 to CL-M. The main classifier 14 identifies whether there is a pedestrian in each of the scanned windows DW on foreground image data based on the trained hyperplanes provided for respective clusters CL-1 to CL-M.

The configuration of the drive support system 1 is based on the clusters CL-1 to CL-M into which the score vector is classified. In this embodiment, a large number of, for example, 1000, learning score vectors, have been clustered into the clusters CL-1 to CL-M; some learning score vectors in the large number of learning score vectors show there is a pedestrian, and the remaining score vectors therein show there are no pedestrians.

These score vectors in a vector space VS can be automatically classified into the clusters CL-1 to CL-M using one of known clustering methods with an aid of a computer. For this reason, the configuration of the drive support system 1 according to this embodiment results in no need for a designer to have determined clusters required to classify score vectors. Thus, it is possible to reduce the occurrence of a case where the previously determined clusters are improper for identification of pedestrians.

Figure 11:
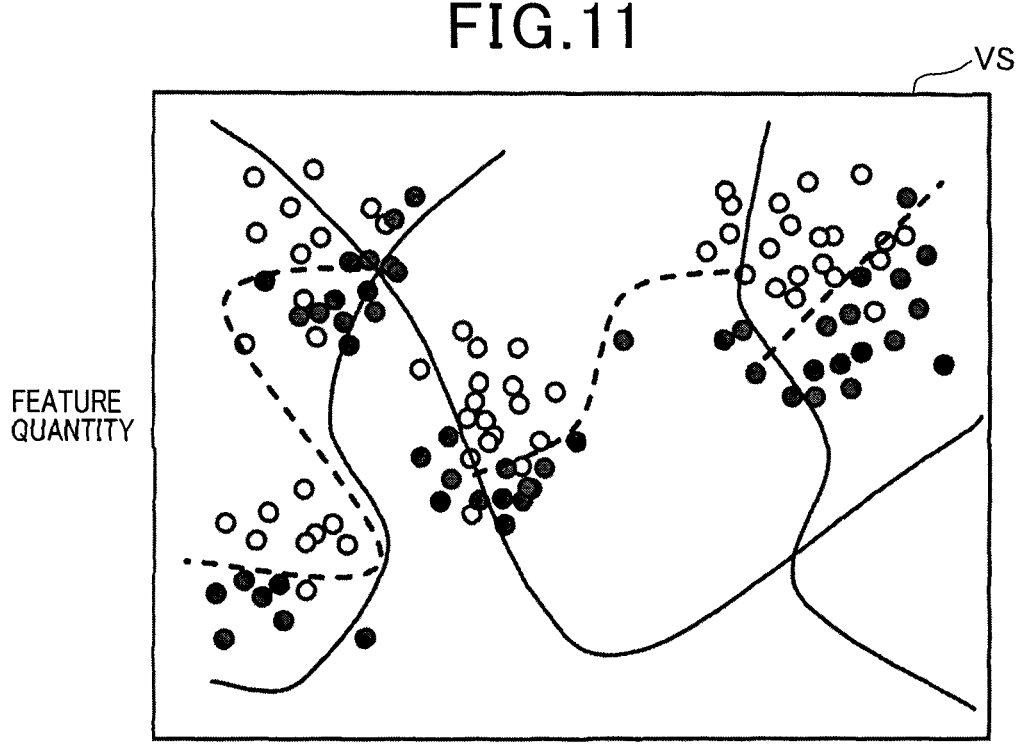
FIG. 11 is a graph schematically illustrating designer's divisions of feature quantities indicative of posture categories.

As described in the "BACKGROUND OF THE INVENTION", let us consider a case where a designer has divided posture patterns, i.e. posture variations, of an object, that is a pedestrian according to this embodiment, into plural posture-pattern categories in order to identify the object. FIG. 11 illustrates a plurality of feature quantities indicative of the posture patterns distributed in a feature space VS. In FIG. 11, solid lines show boundaries between divided feature-quantity categories, and dashed lines represent show hyperplanes defined in the respective divided feature-quantity categories. FIG. 11 shows that the divisions of the feature quantities in the feature space VS may be improper for identifying pedestrians.

The configuration of the drive support system 1 uses the plurality of clusters CL-1 to CL-M, which have been automatically determined by a computer. This makes it easy to set a plurality of clusters even if there are a lot of score vectors corresponding to a lot of posture patterns of pedestrians.

Figure 12:
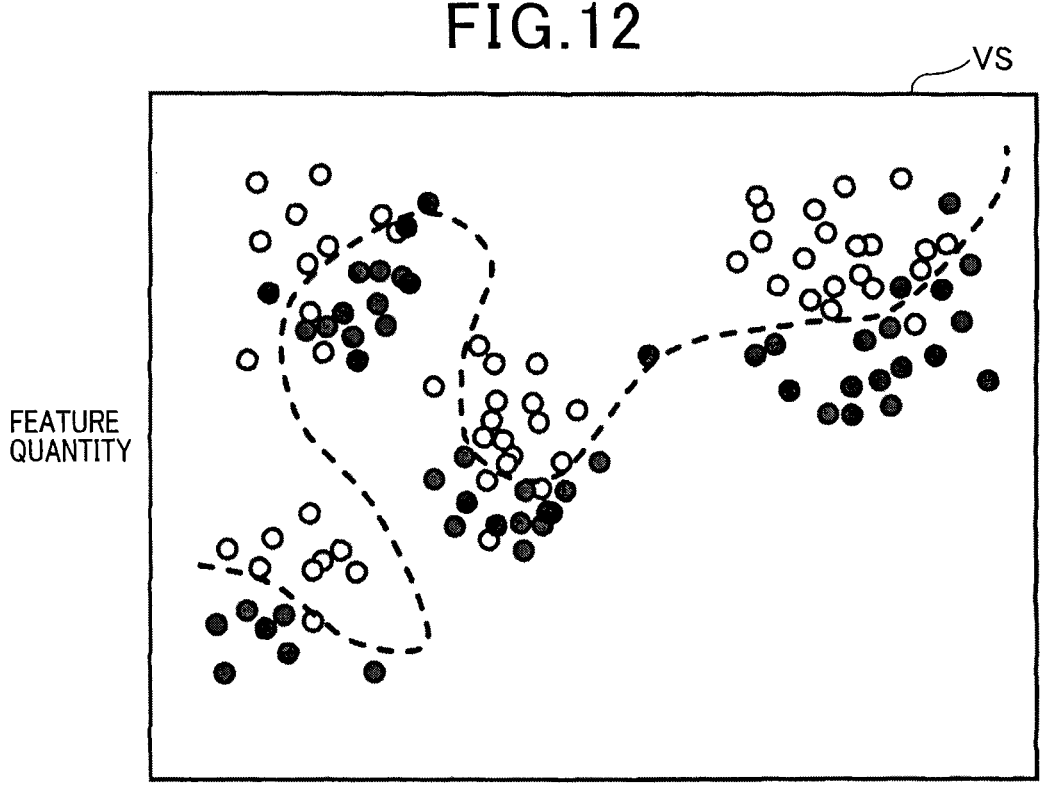
FIG. 12 is a graph schematically illustrating a hyper-plane if no clusters are determined.

In addition, in the drive support system 1 according to this embodiment, a score vector determined by the score vector determiner 12 is classified into any one of the previously determined clusters CL-1 to CL-M, so that a hyperplane trained for identification of pedestrians is determined for each of the clusters CL-1 to CL-M. This configuration makes it possible to determine a hyperplane having, for example, a simple linear shape for each of the clusters CL-1 to CL-M (see FIG. 4). In contrast, if there were no clusters, a hyperplane for identification of pedestrians might have a complicated shape (see the dashed line in FIG. 12). This might make it difficult for a linear SVM to sufficiently identify pedestrians.

In the drive support system 1 according to this embodiment, the cluster determiner 13 is configured to:

calculate a distance between the center of each of the M clusters CL-1, CL-2, CL-M and the position of the score vector input from the score vector generator 12; and compare the distances calculated for the respective M clusters CL-1 to CL-M with each other, thus deter mining one of the clusters CL-1 to CL-M to which the input score vector belongs; the distance for the determined one of the clusters CL-1 to CL-M is the shortest in all the distances.

This configuration results in determination of a cluster to which the score vector belongs using simple distance-calculation and distance-comparison operations, resulting in a light load on the controller 4 required to determine one of the clusters CL-1 to CL-M to which the score vector belongs.

In the drive support system 1 according to this embodiment, each preliminary classifier 11-$i$ ($i=1, 2, \ldots,$ or N) is configured to define five part regions P1 to P5 corresponding to the head, left shoulder right shoulder, lumbar portion, and leg portion of a pedestrian, and calculate a score showing a reliability that each of the five part regions P1 to P5 displays a corresponding part of a pedestrian. Specifically, the scores calculated for the respective five part regions P1 to P5 include at least: the whole-body shape score $s_0$, the head shape score $s_1$, the right-shoulder shape score $S_2$, the left-shoulder shape score $s_3$, the lumbar shape score $s_4$, the leg shape score $s_5$, the head position score $d_1$, the right-shoulder position score $d_2$, the left-shoulder position score $d_3$, the lumbar position score $d_4$, and the leg position score $d_5$.

The score vector generator 12 according to this embodiment generates a score vector containing, as its elements, the sum of the shape score $s_1$ and the position score $d_1$, the sum of the shape score $s_2$ and the position score $d_2$, the sum of the shape score $s_3$ and the position score $d_3$, the sum of the shape score $s_4$ and the position score $d_4$, and that of the shape score $s_5$ and the position score $d_5$. This configuration results in generation of a score vector including shape information indicative of the shapes of images contained in the respective part regions and position information indicative of the positions of the respective part regions. In addition, the number of dimensions of the score vector generated by the score vector generator 12 is lower than that of dimensions of another score vector containing, as its individual elements, the shape scores $s_0, s_1, s_2, s_3, s_4$, and $s_5$ and position scores $d_1, d_2, d_3, d_4$, and $d_5$. This also results in a lighter load on the controller 4 required to generate a score vector.

The score vector generated by the score vector generator 12 individually includes: the shape information indicative of the shapes of images contained in the respective part regions; the position information indicative of the positions of the respective part regions; and information indicative of the whole shape of the whole shape of the assembly of the part regions. For this reason, it is possible to generate clusters for respective posture patterns, i.e. posture variations, of a part of an object; the posture variations include that the part disappears in the object The main classifier 14 according to this embodiment is configured to determine whether a pedestrian is displayed in a part of a digital foreground image contained in each of the scanned detection windows DW based on the score vectors belonging to the respective clusters CL-1 to CL-M. This configuration eliminates the need to add, to the main classifier 14, new information for identification of pedestrians, resulting in the drive support system 1 having a simpler structure.

The main classifier 14 according to this embodiment is equipped with an SVM classifier 21-$j$ having, as a trained hyperplane, a maximum-margin hyperplane that separates the learning score vectors contained in the first group and the learning score vectors contained in the second group while the margin between the maximum-margin hyperplane and the score vectors contained in each of the first and second groups is maximal. The first group contains some learning score vectors showing there is a pedestrian, and the second group contains the remaining learning score vectors showing there are no pedestrians. This configuration reliably ensures the higher pedestrian-identification capability of the drive support system 1.

In this embodiment, the preliminary classifiers 11-1 to 11-N serve as, for example, a plurality of score calculators according to the present disclosure. Each of the plurality of score calculators is configured to extract a feature quantity from an image, and calculate a score using the extracted feature quantity and a model of a specified object. Types of the feature quantities, i.e. their parameters, used by the respective score calculators can be identical to each other, or at least some of which can be different from each other. The models used by the score calculators can be different from each other, or at least some of which can be different from each other.

The score vector generator 12 serves as, for example, a score-vector generator according to the present disclosure, which is configured to generate a score vector having the scores calculated by the score calculates as elements thereof. The cluster determiner 12 serves as, for example, a cluster determiner according to the present disclosure configured to determine, based on previously determined clusters in which the score vector is classifiable, one of the clusters to which the score vector belongs as a target cluster. The main classifier 14 serves as, for example, an object identifier according to the present disclosure configured to have identification conditions previously determined for the respective clusters, and identify whether the specified object is displayed in the image based on one of the identification conditions; the one of the identification conditions is previously determined for the target cluster determined by the cluster determiner.

The present disclosure is not limited to the aforementioned embodiment, and therefore, it can be freely modified within the scope thereof.

In this embodiment, the object identification device installed in the drive support system 1 is configured to identify pedestrians, but the present disclosure is not limited to pedestrian as target objects to be identified. For example, the object identification device can be configured to identify another object, such as motorcycles, motor vehicles, bicycles, and the like. In addition, the object identification device can be configured to identify some or all objects as described previously, such as a pedestrian, a motorcycle, a motor vehicle, a bicycle, or the like.

In this embodiment, the object identification device is configured to use image data picked up by the camera 2, but the present disclosure is not limited thereto. Specifically, the object identification device can be configured to use image data obtained by a measuring device, such as a LIDAR or an infrared camera.

In this embodiment, the object identification device is configured such that each of the N preliminary classifiers 11-1 to 11-N classifies whether there is a pedestrian in corresponding foreground image data sent from the camera 2 using the DPM, but the present disclosure is not limited to the DPM. Specifically, the object identification device can be configured such that each of the N preliminary classifiers 11-1 to 11-N classifies whether there is a pedestrian in corresponding foreground image data sent from the camera 2 using another part model that permits the preliminary classifier to calculate scores. In addition, the object identification device can be configured such that each of the N preliminary classifiers 11-1 to 11-N classifies whether there is a pedestrian in corresponding foreground image data using combination of a plurality of part models that permits the preliminary classifier to calculate scores, for example, as maximum scores for one of the part models.

The object identification device according to this embodiment is configured to generate the score vector containing, as its elements, a plurality of scores, each of which is the sum of a shape score and a position score, but the present disclosure is not limited thereto. Specifically, the object identification device can be configured to generate the score vector containing, as its elements, a plurality of scores each of which is only a shape score or a position score, or includes shape and position scores. If another type preliminary classifier, which is capable of calculating scores indicative of results of identification, is used as each preliminary cluster, it is possible to arrange the scores calculated by each of the preliminary classifiers, thus generating a score vector.

In this embodiment, a Euclidean distance is used as a measurement parameter indicative of the similarity between score vectors, but, for example, a Manhattan distance, a Hamming distance, or a maximum norm can be used as a measurement parameter indicative of a similarity between score vectors.

In this embodiment, linear SVMs are used as components of the main classifier 14, but Kernel SVMs, neural network classifiers, logistic regression classifiers, or other known classifiers can be used.

In this embodiment, the object identification device is configured such that the pedestrian identifier 22 identifies whether there is a pedestrian in each of the scanned detection windows DW based on whether the score vector belonging to a corresponding cluster CL-j shows a pedestrian, but the present disclosure is not limited thereto.

Figure 13:
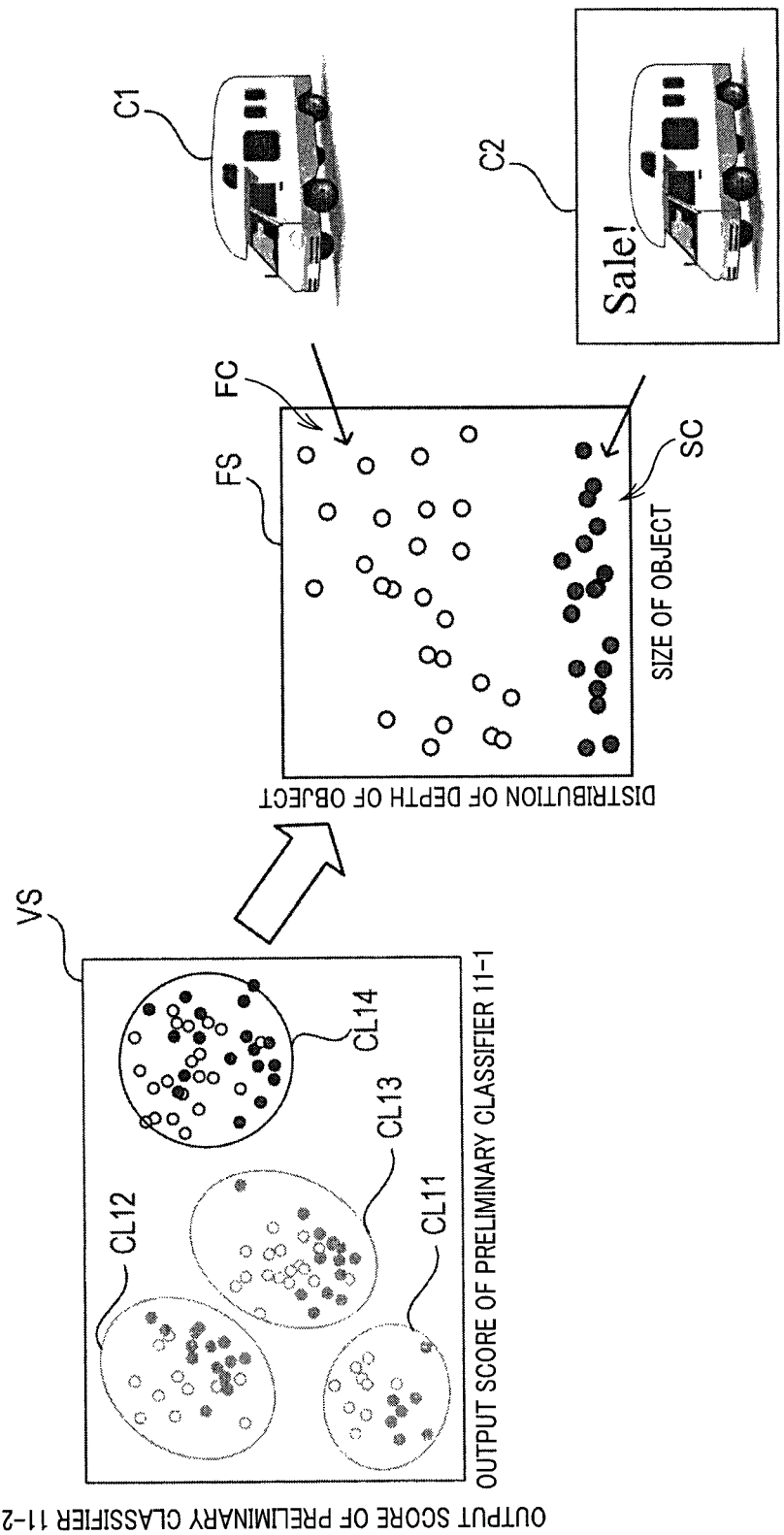
FIG. 13 is a graph schematically illustrating another identification method according to a modification of the embodiment.

For example, the left side of FIG. 13 schematically illustrates previously determined clusters CL11 to CL14 in a vector space VS corresponding to the right side of FIG. 4. If the score vector belongs to at least one of the clusters CL11 to CL14, such as the cluster CL14, the pedestrian identifier 22 can be configured to identify whether there is a pedestrian in each of the scanned detection windows DW based on another type of feature quantity different from the score vector.

For example, in FIG. 13, the distribution of the score vectors contained in the cluster CL14 makes it difficult for the pedestrian identifier 22 to identify whether the input score vector belonging to the cluster CL14 shows a pedestrian or a non-pedestrian. Specifically, the distribution of the score vectors contained in the cluster CL14 makes it difficult for the pedestrian identifier 22 to identify whether the input score vector belonging to the cluster CL14 shows a pedestrian or a non-pedestrian using a simple identification condition of, for example, the previously learned hyperplane. Note that the cluster CL14 is for example a cluster to which score vectors obtained based on foreground images of one sides of motor vehicles belong.

Figure 5:
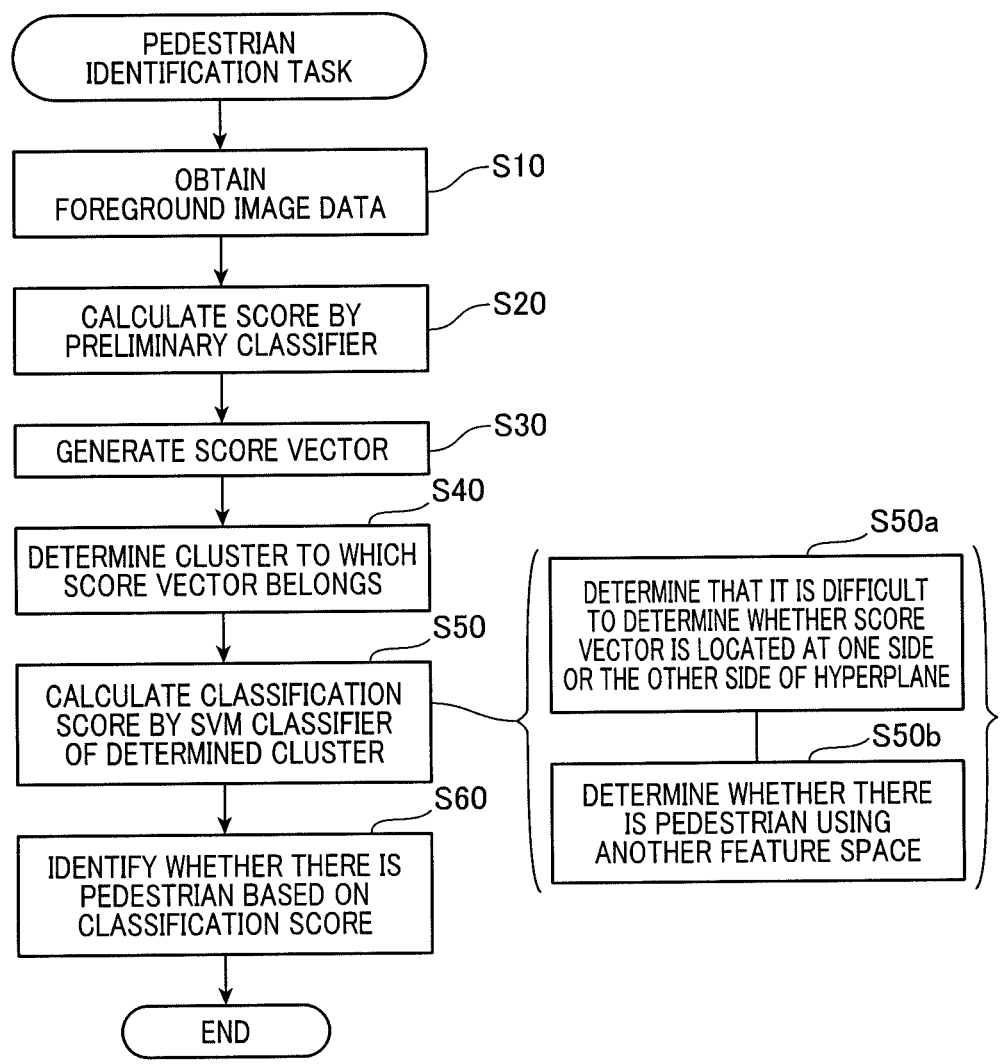
FIG. 5 is a flowchart schematically illustrating a pedestrian identification task carried out by a controller illustrated in FIG. 1.

In this case, as illustrated in step S50 of FIG. 5, if the controller 4 determines that it is difficult to determine whether the score vector belonging to the cluster is located at one side or the other side of the learned hyperplane (see step S50a), the controller 4 uses a feature space FS defined by sizes of objects and distributions of depths of the same objects as other types of feature quantities instead of the score vector, and determines whether the score vector belongs to a first category FC in which some objects each having a sufficient depth are classified or a second category SC in which the remaining objects each having a flat shape, i.e. a small distribution of depth, are classified in step S50b. Information of the depths and sizes of the objects located ahead of the vehicle V can be measured by a stereo camera or a distance sensor included in sensors 50 illustrated in FIG. 1.

When it is determined that the score vector belongs to the first category FC, it is determined that an object corresponding to the score vector is an object having a sufficient depth, such as a real motor vehicle (see C1 in FIG. 13). Otherwise, if it is determined that the score vector belongs to the second category SC, it is determined that an object corresponding to the score vector is a flat object, such as a signboard (see C2 in FIG. 13).

Figure 14:
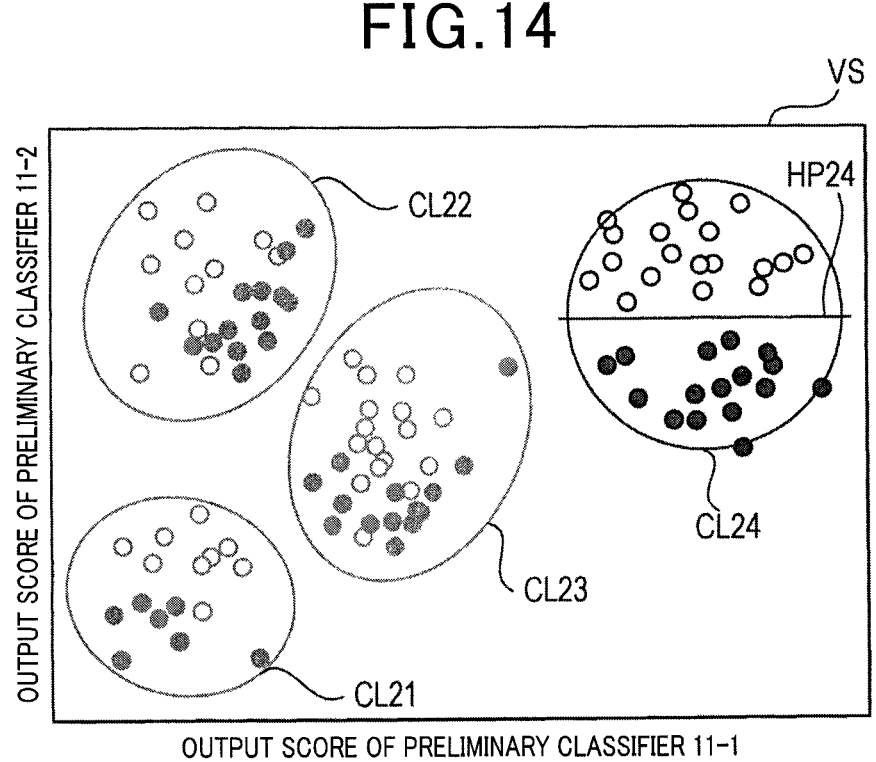
FIG. 14 is a graph schematically illustrating a score-vector distribution in a vector space according to another modification of the embodiment.

In addition, in the object identification device according to this embodiment, an optimal hyperplane for each cluster has been learned based on all components of the learning score vectors, but the present disclosure is not limited thereto. Specifically, a hyperplane of at least one SVM classifier for a corresponding cluster, such as a hyperplane HP24 for a cluster CL24 in all clusters CL21 to CL24 illustrated in FIG. 14, can have been learned based on some components of each learning score vector, such as scores of each score vector corresponding to the vertical axis of the vector space VS. This can reduce the storage capacity and calculation time required for the at least one SVM classifier.

For example, the main classifier 14 can be configured to:

use, as feature quantities, all scores of an input score vector for the cluster CL1 illustrated in FIG. 4 for pedestrian identification;

use, as feature quantities, information of distances of an object corresponding to an input score vector for the cluster CL2 illustrated in FIG. 4;

use, as feature quantities, some scores of an input score vector for the cluster CL3 illustrated in FIG. 4 for pedestrian identification; and use, as feature quantities, color histograms in a scanned detection window DW corresponding to an input score vector for the cluster CL4 illustrated in FIG. 4.

That is, the object identification device can be configured to use different feature quantities for pedestrian identification among the clusters.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An object identifying device for identifying whether an object whose posture displayed in an image varies, the object identifying device comprising:

a plurality of preliminary identifying means that:

obtains, from the image, a feature quantity previously set to identify, in the image, an identification target object that is the object predetermined as an identification target; and calculates a score according to the obtained feature quantity and score calculation conditions previously determined to be different from each other, the score representing a reliability that the identification target object is displayed in the image;

a score-vector generating means that generates a score vector having the scores calculated by the plurality of preliminary identifying means as elements thereof;

a cluster determining means that determines, in previously determined clusters for classifying the score vector, a cluster that includes the score vector generated by the score-vector generating means; and a main identifying means that:

has determination conditions previously determined, for the respective clusters, for determining whether the identification target object is displayed in the image; and identifies the identification target object displayed in the image based on one of the determination conditions, the one of the determination conditions corresponding to the cluster determined by the cluster determining means.

2. The object identifying device according to claim 1, wherein:

the identification target object is comprised of a plurality of different parts each corresponding to one part of the identification target object, and the plurality of preliminary identifying means scan part regions provided to correspond to the respective parts in the image to calculate, for each of the part regions, a part score representing a reliability that the one part corresponding to the part region is displayed in the image, the part score for each of the part regions being composed of at least:

a first score that represents a reliability that the one part corresponding to the part region is displayed in the part region; and a second score that represents a reliability of a position of the part region.

3. The object identifying device according to claim 2, wherein:

the score-vector generating means generates the score vector such that the score vector includes at least one of the first score and the second score as the elements thereof.

4. The object identifying device according to claim 2, wherein:

the score-vector generating means generates the score vector such that the score vector includes, as the elements thereof, a score representing the sum of the first score and the second score.

5. The object identifying device according to claim 1, wherein:

the cluster determining means is configured to determine whether the identification target object is displayed in the image according to the score vector used to determine the cluster.

6. The device according to claim 5, wherein:

the determination conditions are configured to enable a support vector machine to classify the score vectors into:

score vectors representing that the identification target object is displayed in the image; and score vectors representing that the identification target object is not displayed in the image.

7. The object identifying device according to claim 1, wherein the cluster determining means determines the cluster based on distances between the score vector and each of the clusters.

8. The object identifying device according to claim 7, wherein:

the identification target object is comprised of a plurality of different parts each corresponding to one part of the identification target object, and the plurality of preliminary identifying means scan part regions provided to correspond to the respective parts in the image to calculate, for each of the part regions, a part score representing a reliability that the one part corresponding to the part region is displayed in the image, the part score for each of the part regions being composed of at least:

a first score that represents a reliability that the one part corresponding to the part region is displayed in the part region; and a second score that represents a reliability of a position of the part region.

* * * * *